United States Patent
Stadler

(10) Patent No.: US 6,840,134 B2
(45) Date of Patent: Jan. 11, 2005

(54) HAND BRAKE ASSEMBLY FOR A MOTOR VEHICLE

(75) Inventor: Falk Stadler, Gaeufelden (DE)

(73) Assignee: DaimlerChrysler AG, Stuttgart (DE)

( * ) Notice: Subject to any disclaimer, the term of this patent is extended or adjusted under 35 U.S.C. 154(b) by 142 days.

(21) Appl. No.: 10/225,180

(22) Filed: Aug. 22, 2002

(65) Prior Publication Data

US 2003/0075390 A1 Apr. 24, 2003

(30) Foreign Application Priority Data

Aug. 23, 2001 (DE) .......................................... 101 41 426

(51) Int. Cl.$^7$ ................................................ G05G 5/06
(52) U.S. Cl. ............................ 74/537; 74/575; 74/529; 74/538
(58) Field of Search .......................... 74/479.01, 480 R, 74/480 B, 481, 483 R, 74, 575, 502.2, 489, 483 PB, 516, 529, 536, 538, 537

(56) References Cited

U.S. PATENT DOCUMENTS 3,577,797 A * 5/1971 Todeschini ............... 74/479.01
4,311,060 A * 1/1982 Kawaguchi et al. ........... 74/538
4,748,928 A * 6/1988 Nakamura ................ 74/479.01
6,016,718 A * 1/2000 Park et al. ..................... 74/538

FOREIGN PATENT DOCUMENTS

| DE | 2 226 967 | 12/1974 |
| DE | 25 46 111 | 4/1977 |
| DE | 197 37 738 A1 | 3/1999 |

* cited by examiner

*Primary Examiner*—David A. Bucci
*Assistant Examiner*—Bradley J. Van Pelt
(74) *Attorney, Agent, or Firm*—Crowell & Moring LLP

(57) ABSTRACT

A hand brake arrangement for a motor vehicle, particularly a passenger car, has a brake lever which is swivellably disposed on a vehicle-fixed stationary base and, with a locking device, can be locked in different swivelling positions. The brake lever has an unlocking device for releasing the locking. The unlocking device has two release press buttons which each drive a push rod, a rocker lever which is swivellable about a rocker axis disposed on the brake lever and on which, on two sides which are opposed with respect to the rocker axis, the two push rods are pivotally connected. A release cable control, on one end, is applied to at least one of the push rods or to at least one of the release press buttons or to the rocker lever and, on the other end, is coupled with the locking device.

19 Claims, 3 Drawing Sheets

HAND BRAKE ASSEMBLY FOR A MOTOR VEHICLE

This application claims the priority of German Patent Application No. 101 41 426.9-21, filed Aug. 23, 2001, the disclosure of which is expressly incorporated by reference herein.

BACKGROUND OF THE INVENTION

The present invention relates to a hand brake arrangement for a motor vehicle, particularly for a passenger car, having a brake lever which is swivellably disposed on a vehicle-fixed stationary base and, by means of a locking device, can be locked in different swivelling positions, the brake lever having an unlocking device for releasing the locking achieved by means of the locking device.

DE 197 37 738 A1 discloses a hand brake arrangement which has a manually operable brake lever swivellably disposed on a vehicle-fixed stationary base and lockable in different swivelling positions with a locking device. In addition, the brake lever is equipped with an unlocking device for releasing the locking achieved with the locking device. The known locking device is formed by a spring-loaded detent pawl which interacts with a notch element having several notches, for example, in the form of a toothed rack which is formed on the stationary base. During a swivelling adjustment of the brake lever the detent pawl will automatically engage at the notch element and thereby lock the respective brake lever position.

In the known hand brake arrangement, the unlocking device has a flexible woven band which, at one end, is fastened to the detent pawl and, at the other end, to an end of the brake lever facing away from the stationary base. On an underside facing the woven band, a depression is recessed in the brake lever into which the woven band can be pressed manually for operating the unlocking device. In this manner, a tension force can be introduced into the woven band, whereby the detent pawl is disengaged from the notch element against the pretensioning of the detent pawl, so that the locking is unlocked.

SUMMARY OF THE INVENTION

An object of the present invention is to the problem of providing a more advantageous construction of a hand brake arrangement has been solved by a hand brake arrangement in which the unlocking device has two release press buttons which each drive a push rod, a rocker lever which is swivellably about a rocker axis disposed on the brake lever and on which, on two sides which are opposed with respect to the rocker axis, the two push rods are pivotally connected, as well as a release cable control which, on one end, is applied to at least one of the push rods or to at least one of the release press buttons or to the rocker lever and, on the other end, is coupled with the locking device.

The present invention is based on the recognition of equipping the unlocking device with two release press buttons which are coupled with one another by a rocker lever arrangement driving a release cable control. By creating two mutually coupled, simultaneously operable release press buttons, an unlocking device is provided which can be operated particularly easily and comfortably and which, in particular, requires a relatively low expenditure of force for releasing the locking.

Particularly as a result of a suitable arrangement of the two release press buttons, even a relatively tightly pulled hand brake as a rule can still be released by one hand can be ensure. Because of the restricted coupling of the two release press buttons, the hand brake can always also be released by a one-sided operation of one of the two release press buttons.

The suggested hand brake arrangement can therefore be used equally well in left-hand steered as well as right-hand steered vehicles.

In further expedient developments, the two release press buttons and/or the two push rods of the rocker lever arrangement, which are connected with respect to the drive with one of the keys respectively, can in an essentially mutually coaxially adjustable manner be disposed in or on the brake lever. With this arrangement or bearing, relatively low release forces are generated which, in the case of a corresponding arrangement on the brake lever, can easily be applied with the thumb and the index finger of one hand.

In one further expedient development, the brake lever may have a handle at an end facing away from the stationary base, in or on which handle the release press buttons, the push rods and the rocker lever are arranged. An arrangement is preferable here in which the operating directions of the release press buttons in each swivelling position of the brake lever extend essentially parallel to the swivelling axis of the brake lever. Thereby, an advantageous ergonometry can be achieved which facilitates an operating of the unlocking device.

BRIEF DESCRIPTION OF THE DRAWINGS

These and other objects, features and advantages of the present invention will become more readily apparent from the following detailed description of currently preferred configurations thereof when taken in conjunction with the accompanying drawings wherein.

DETAILED DESCRIPTION OF THE DRAWINGS

Figure 1:
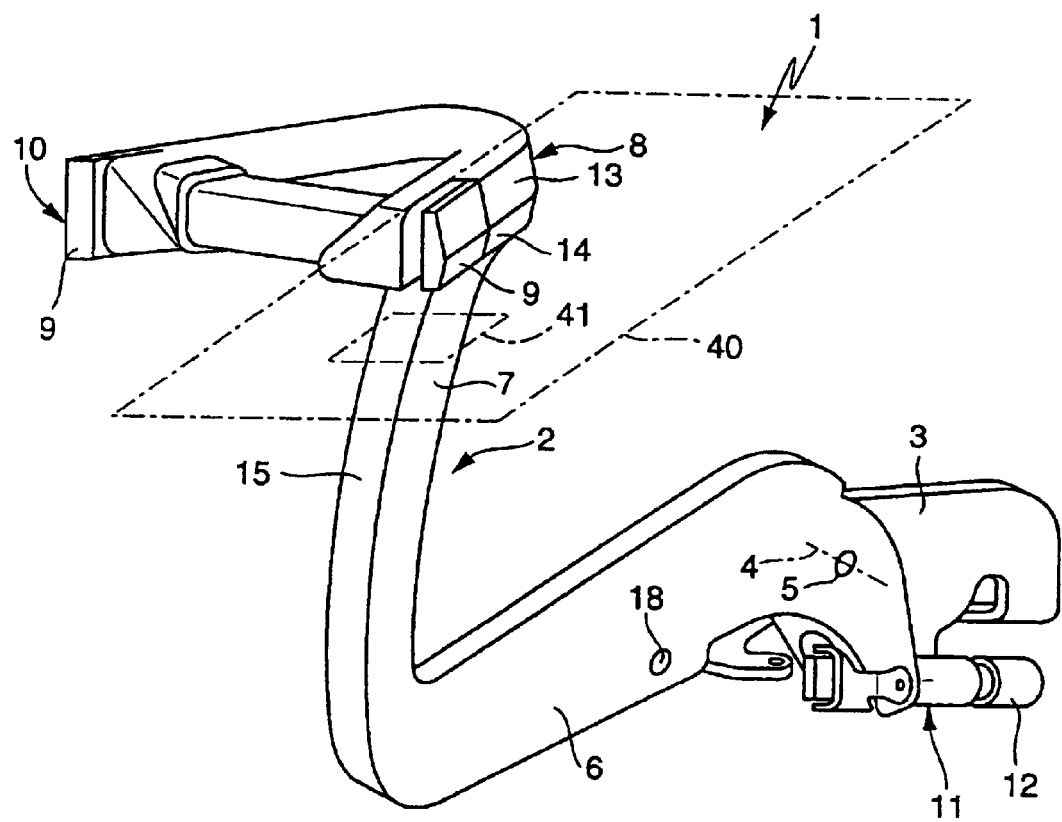
FIG. 1 is a schematic perspective isolated view of a hand brake arrangement according to the invention.

As shown in FIG. 1, a hand brake arrangement designated generally by numeral 1 for a motor vehicle, particularly of a passenger car, has a brake lever designated generally by numeral 2 which is swivellable about an axis 4 disposed on a vehicle-fixed stationary base 3. A corresponding pivot pin is designated by the reference numeral 5. Normally, this swivelling axis 4 extends transversely to the longitudinal direction of the vehicle and horizontally; however, other alignments of the swivelling axis 4 are possible within the scope of the present invention.

In the area of the console 3, the brake lever 2 is connected with a brake cable assembly 11. In addition, a device 12 for an automatic brake cable retightening may be provided.

In the currently preferred embodiment illustrated which the brake lever 2 is disposed on the stationary base 3. Furthermore, the brake lever 2 has a handle section 7 which is bent away from the stationary base section 6 by approximately 80° to 100°, according to FIG. 1, in the upward direction, and carries a handle 8 at an end of the brake lever 2 facing away from the stationary base 3. In a starting position of the brake lever 2, which exists when the hand brake is inactive or inoperative, the stationary base section 6 extends essentially horizontally, while the handle section 7 extends essentially vertically.

In FIG. 1, a section of a center console 40, which is normally arranged in the interior of a motor vehicle between the driver seat and the front passenger seat, is outlined by broken lines. The brake lever 2 according to the invention is integrated in this center console 40, specifically such that its stationary base section 6 extends in the interior of the center console 40. The handle section 7 penetrates the center console 40 in an opening 41 formed therein and projects into the vehicle interior in order to position the handle 8 there above the center console 40.

Corresponding to the particularly advantageous embodiment illustrated in FIG. 1, the handle section 7 does not have a linear but a curved construction. This curvature is advantageously selected such that the handle section 7 extends essentially in the shape of a circular arc with respect to the swivelling axis 4 of the brake lever 2 . That is, the profile of the handle section 7 extends along a circular arc whose center point is situated on the swivelling axis 4. This shaping has the result that, in the plane of the opening 41, the relative position between the handle section 7 and the opening 41 is essentially invariant during swivelling operations of the brake lever 2.

The opening 41 may therefore have a relatively small dimension. In particular, the opening 41 has a cross-section which has approximately the same size as the cross-section of the handle section 7 penetrating therethrough. As a result of this construction, the handle section 7 can extend in a particularly simple dust-tight manner out of the center console 40. High-expenditure sealing measures, for example, by way of bellows or the like, can be eliminated. Furthermore, the brake lever 2 integrated in this manner into the center console 40 has an aesthetically particularly attractive appearance.

Furthermore, it should be noted that, with its special shaping, the handle 8, when operated manually, has a central force introduction point virtually situated at the forward end of the handle 8, whereby a maximal lever length is achieved at the brake lever 2. For generating sufficient lever forces, the brake lever 2 according to the invention can therefore have a relatively small size.

On the handle 8, one release press button 9 respectively is arranged on two opposite sides. The release press buttons 9 are components of an unlocking device 10 which is explained below with reference to FIGS. 2 and 3. In the arrangement illustrated here, the two release press buttons 9 are to be manually operated such that they are moved toward one another. In this embodiment, these operating directions extend parallel to the swivelling axis 4 of the brake lever 2, specifically independently of the respective swivelling position of the brake lever 2.

The handle 8 may, for example, have a top shell 13 and a bottom shell 14 which, in the assembled condition, result in the handle 8. In an expedient illustrated embodiment, this bottom shell 14, the handle section 7 and the stationary base section 6, may be produced as a one piece component, thus as an integral component, made, for example, by aluminum diecasting. The handle section 7 and the stationary base section 6 have a U-shaped profile which, in the stationary base section 6, is open toward the bottom and in the handle section 7 is open toward the front, thus on the side facing the observer. In the assembled brake lever 2, at least in the area of the handle section 7, the open side of the U-profile can then be closed by a screen 15.

Figure 2:
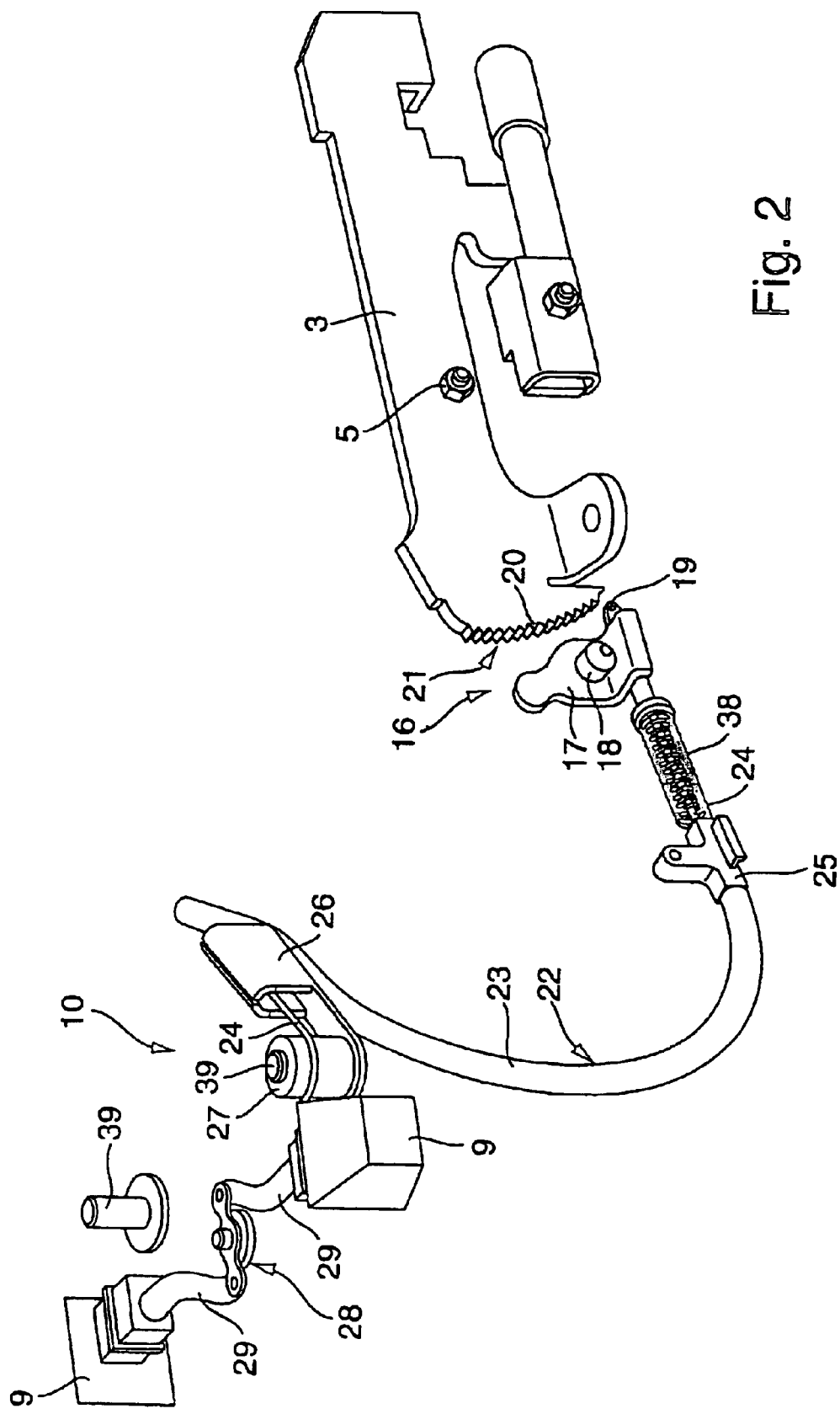
FIG. 2 is a schematic perspective view of the hand brake arrangement according to FIG. 1 but in which the brake lever is omitted.

In FIG. 2, the brake lever 2, thus the handle 8, the handle section 7 and the stationary base section 6, are omitted in order to simplify the representation of the elements accommodated in the brake lever 2. The hand brake arrangement 1 according to the invention has a locking device 16 for locking the brake lever 2 in different swivelling positions. Normally, such a locking device 16 has a detent pawl 17 which is swivellably disposed on the brake lever 2 by a pivot pin 18. The detent pawl has notches 19 which, when the brake lever 2 is swivelled out of its starting position, interact with teeth 20 of a notch curvature 21 which is constructed on the stationary base 3. This engagement of the notches 19 in the teeth 20 of the notch curvature 21 results in the desired locking of the respective lever position.

In order to be able to swivel back the brake lever 2, the locking device 6 must be released; that is, the detent pawl 17 must be disengaged from the notch curvature 21. For this purpose, the unlocking device 10 has a cable control 22 which is coupled with the locking device 16. The cable control 22 is advantageously constructed as a so-called Bowden cable which has a pressure-resistant pressure sleeve 23 in which a tension-proof tension cable 24, such as a wire rope, is displaceably disposed. At its end assigned to the stationary base 3, the tension cable 24 is connected with the detent pawl 17 and can pull on it for pulling the notches 19 out of the teeth 20 of the notch curvature 21.

The end of the pressure sleeve 23 facing the stationary base 3 is accommodated in a stationary-base-side cable support 25 which, in turn, is fastened to the brake lever 2. On its other end assigned to the handle, the pressure sleeve 23 is fixed on a handle-side cable support 26 which, in turn, is fastened to the handle 8. In order to pretension the detent pawl 17 for an engagement with the notch curvature 21, spring devices are provided in the form of a compression spring 38. In the case of the special construction illustrated here, this compression spring 38 is arranged such that it is supported on one end by way of the stationary-base-side cable support 25 on the pressure sleeve 23 and, on the other end, on the stationary-base-side end of the tension cable 24. To this extent, the pretensioning devices of the locking device 16 are integrated in the unlocking device 10. The separate compression spring 38 improves the acoustics as well.

Figure 3:
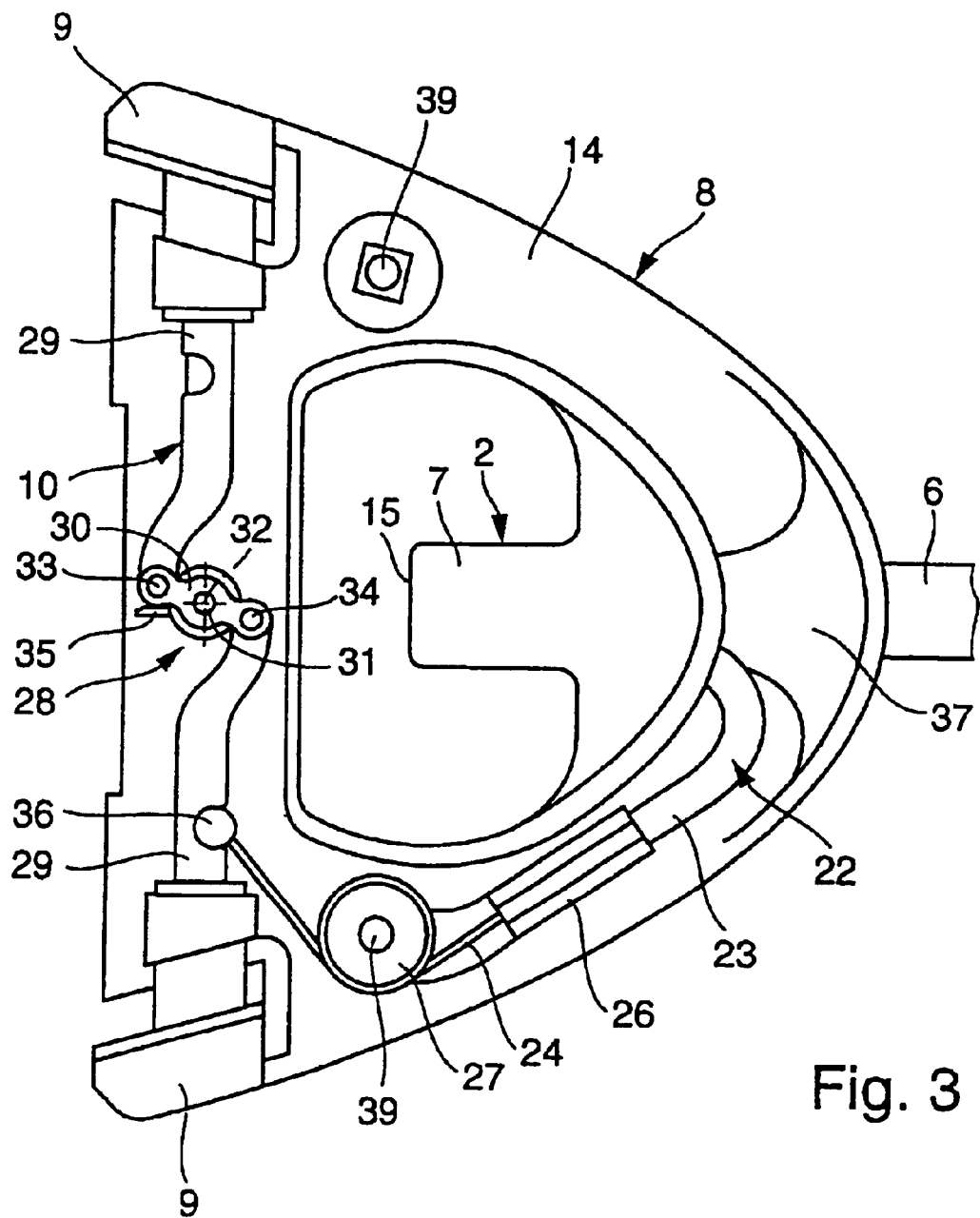
FIG. 3 is a schematic top view of a handle of the brake lever of the hand brake arrangement according to the invention in which the top shell is omitted.

In the handle 8, the pertaining end of the tension cable 24 is guided around a deflection pulley 27 and, with respect to the drive, is connected with a rocker lever arrangement 28 which will now be explained in detail with reference to FIG. 3. Each release press button 9 is fixedly connected with a push rod 29, so that each push rod 29 is driven by an operation of the corresponding release press buttons 9. The arrangement and bearing of the release press buttons 9 as well as of the two push rods 29 is selected such that the release press buttons 9 and the push rods 29 can be adjusted essentially coaxially with respect to one another.

The rocker lever arrangement 28 comprises a rocker lever 30 which, swivellably on a central pivot pin 31 about a rocker axis 32 is disposed on the brake lever 2 or on its handle 8. On this rocker lever 30, at reference numerals 33, 34 respectively, the two push rods 29 are disposed on two sides situated opposite with respect to the rocker axis 32. In this manner, a restricted coupling of the two push rods 29 and thus of the two release press buttons 9 is implemented by way of the rocker lever 30. In other words, the operation of one of the two release press buttons 9 forces, by way of the rocker lever arrangement 28, a corresponding opposed adjusting movement of the other release press button 9. In addition, on the pivot pin 31 of the rocker lever 30, a leg spring 35 is arranged which is applied to the rocker lever 30 such that it introduces a pretensioning into the rocker lever arrangement 28, which pretensioning drives the release press buttons 9 toward the outside, into an inoperative starting position.

In the illustrated embodiment numeral 36 on one of the two push rods 29. By way of the deflection pulley 27 rotatably disposed on a bearing 39, a low-friction deflection of the tension lever 24 is achieved into a direction which ensures that a pressure operation of the two release press buttons 9 introduces a tension force into the tension cable 24. In the interior of the brake lever 2, a tube or duct 37 is constructed in which the release cable control 22 is laid. The duct 37 therefore extends from the handle 8 to the detent pawl 17.

A special advantage of the hand brake arrangement 1 according to the invention is the fact that, by virtue of the two release press buttons 9 which can be operated toward one another, a particularly comfortable and easily operable unlocking device 10 is provided which, in particular, can be operated with one hand such that even a relatively tightly pulled hand brake can be released comparatively easily. Furthermore, the handle 8, which is D-shaped in its top view, provides, also in the starting position of the brake lever 2, a comfortable hand rest, which increases the use value of the hand brake arrangement 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Hand brake arrangement for a motor vehicle, comprising a brake lever swivellably disposed on a vehicle-fixed stationary base, a locking device for locking the brake lever in different swivelling positions, and an unlocking device for releasing the locking effected by the locking device, wherein the unlocking device has two release press buttons each driving a push rod, a rocker lever swivellable about a rocker axis disposed on the brake lever and on which, on two sides which are opposed with respect to the rocker axis, the two push rods being pivotally connected, and a release cable control which, on one end, is associated with one of at least one of the push rods, at least one of the release press buttons and the rocker lever and, on another end, is operatively coupleable with the locking device.

2. Hand brake arrangement according to claim 1, wherein the push rods are disposed in an essentially mutually coaxially adjustable manner in or on the brake lever.

3. Hand brake arrangement according to claim 1, wherein the release press buttons are disposed in an essentially mutually coaxially adjustable manner in or on the brake lever.

4. Hand brake arrangement according to claim 3, wherein the push rods are disposed in an essentially mutually coaxially adjustable manner in or on the brake lever.

5. Hand brake arrangement according to claim 1, wherein the unlocking device has spring devices which pretension the release press buttons into an inoperative starting position.

6. Hand brake arrangement according to claim 5, wherein the spring devices are applied to the rocker lever.

7. Hand brake arrangement according to claim 1, wherein the release cable control comprises a Bowden cable having a tension cable and a pressure sleeve, the tension cable being applied by a deflection pulley to at least one of the push rods, at least one of the release press buttons or to the rocker lever.

8. Hand brake arrangement according to claim 1, wherein the release press buttons are arranged such that the operating direction of one release press button extends essentially coaxially to the operating direction of the other release press button.

9. Hand brake arrangement according to claim 1, wherein the release press buttons are arranged such that their operating directions extend essentially parallel to the swivelling axis of the brake lever.

10. Hand brake arrangement according to claim 1, wherein, on an end facing away from the stationary base, the brake lever has a handle in or on which the release press buttons, the push rod and the rocker lever are operatively arranged.

11. Hand brake arrangement according to claim 10, wherein the brake lever has a duct which, at one end, terminates in the interior of the handle and, at another end, ends at the locking device, with the release cable control extending inside the duct.

12. Hand brake arrangement according to claim 10, wherein the brake lever comprises a handle section and a stationary base section bent with respect thereto by approximately 90°, the handle section carrying the handle and in the starting position of the brake lever, with the hand brake not in operation, extending substantially vertically, the stationary base section being disposed on the stationary base and, in the starting position of the brake lever, extending substantially horizontally.

13. Hand brake arrangement according to claim 12, wherein the handle section is curved substantially in a circular-arc shape with respect to the swivelling axis of the brake lever.

14. Hand brake arrangement according to claim 12, wherein the brake lever is integrated in a center console of the vehicle such that the stationary base section extends in an interior of the center console, and the handle section projects through and out of an opening in the center console and carries the handle in a vehicle interior.

15. Hand brake arrangement according to claim 14, wherein the opening has approximately the same cross-section as the handle section.

16. Hand brake arrangement according to claim 10, wherein the handle comprises a bottom shell and a top shell.

17. Hand brake arrangement according to claim 16, wherein the brake lever comprises a handle section and a stationary base section bent with respect thereto by approximately 90°, the handle section carrying the handle and in the starting position of the brake lever, with the hand brake not in operation, extending substantially vertically, the stationary base section being disposed on the stationary base and, in the starting position of the brake lever, extending substantially horizontally, and the bottom shell, the handle section and the stationary base section constitute a one-piece integral component.

18. Hand brake arrangement according to claim 1, wherein the locking device includes a detent pawl disposed on the brake lever and which, during swivelling positions of the brake lever, engages in a notch curvature constructed on the stationary base, the release cable control being applied to the detent pawl which disengages from the notch curvature when the release cable control is operated.

19. Hand brake arrangement according to claim 18, wherein spring devices pretension the detent pawl into a detent position thereof, the spring devices with the release cable control configured as a Bowden cable with a tension cable and a pressure sleeve constructed as a compression spring arranged at the end of the Bowden cable facing the detent pawl between the pressure sleeve and the tension cable.

* * * * *